Nov. 25, 1930. L. PIERCE Re. 17,886
CRANE
Original Filed Feb. 18, 1926
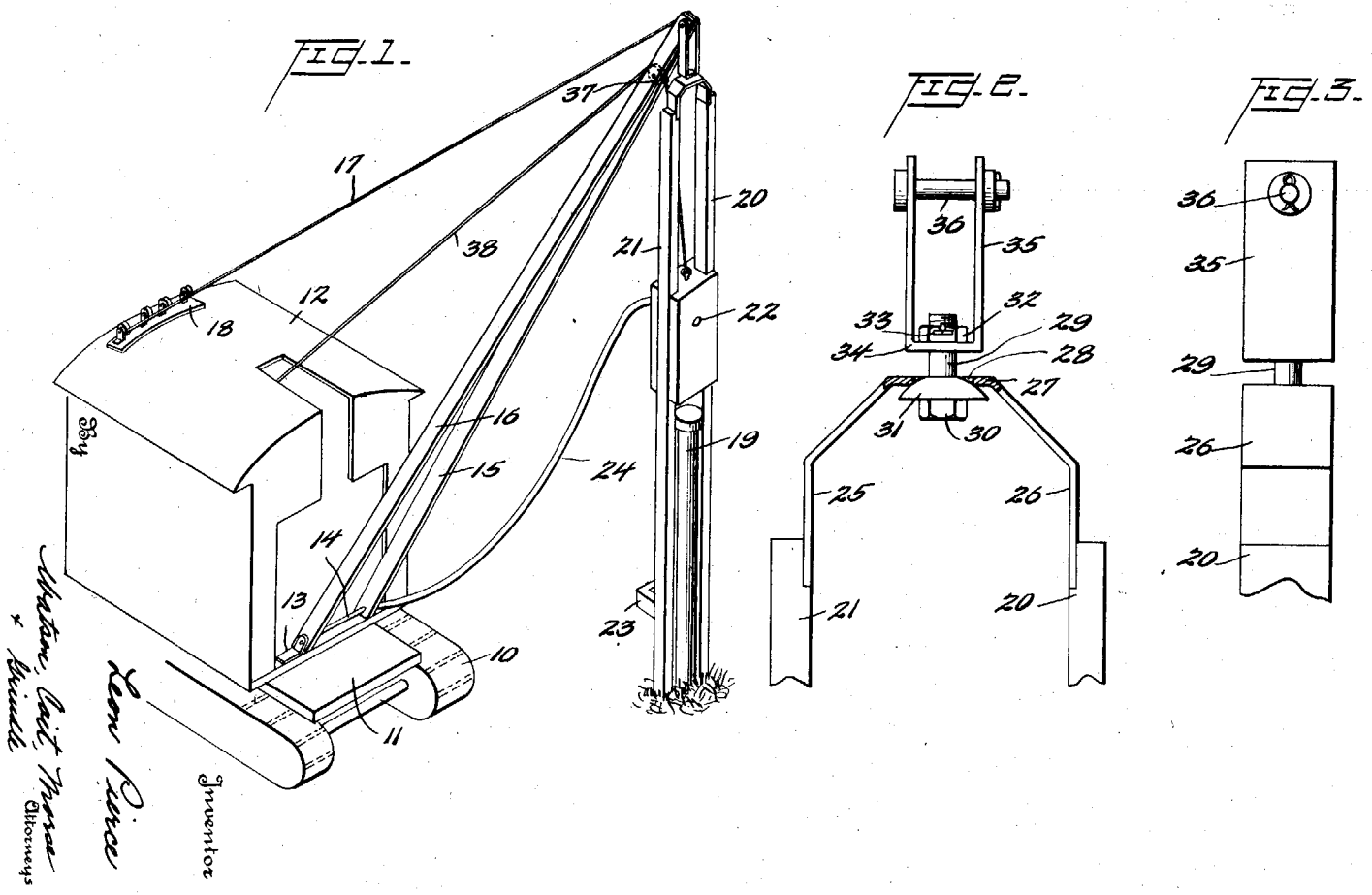

Reissued Nov. 25, 1930

Re. 17,886

UNITED STATES PATENT OFFICE

LEON PIERCE, OF NEW YORK, N. Y., ASSIGNOR TO PIERCE STEEL PILE CORPORATION, A CORPORATION OF NEW YORK

CRANE

Original No. 1,613,409, dated January 4, 1927, Serial No. 89,034, filed February 18, 1926. Application for reissue filed May 5, 1928. Serial No. 275,532.

The main object of this invention is to provide an improvement to a crane. The improvement relates to leads which are secured at their upper ends to the boom of the crane. These leads are used for guiding piles which are to be sunken into the ground in laying foundations. Heretofore it was necessary to detach the leads from the boom when using the crane as a hoisting apparatus. It is the purpose of this invention to provide a form of connection between the leads and boom, whereby the leads may be rotated to any desirable angle without disturbing the boom and at the same time permit said leads to be swung to a position in which they will not interfere with use of the boom as a hoisting member. Leads, which are adjustably attached to the boom as they are illustrated in this invention, serve an additional valuable purpose. When attached to the boom of the crane and suspended in vertical position resting on the ground, they serve as a brace for counterbalancing the weight of the boom on the crane. When the boom is inclined to a 45 degree angle, said boom has the tendency, especially during hoisting articles, to upset the crane. By supporting the tip or outer extreme projecting end of the boom from below, this upsetting tendency is eliminated, and in this invention is accomplished by the attached leads.

The above and other objects will become apparent in the description below, in which characters of reference refer to like-named parts in the drawing.

Referring briefly to the drawing:

Figure 1 is a perspective view, showing a crane with leads in applied position.

Figure 2 is a front elevational view of the connection used between the leads and boom.

Figure 3 is a side elevational view of Figure 2.

Referring in detail to the drawing, the numeral 10 indicates the treads of a tractor under-carriage on which a platform 11 is supported. This platform has a housing structure 12 mounted thereon in which the operating machinery is positioned. The front of the housing structure 12 is open and has brackets such as 13 or the like mounted on the floor. These brackets support a horizontal king bolt 14 which passes thru the lower end of and supports the inner ends of a pair of beams 15 and 16 which form a boom. The beams 15 and 16 incline toward each other as they extend upwardly and are joined together at their upper or outer ends. The boom is suspended in angular position from adjustable guy ropes 17 which are trained about pulleys 18 on the roof of the housing structure and on the boom. The invention is primarily adapted to be used in guiding piles of relatively large diameter into a position where they will be urged vertically into the ground. These piles, one of which is indicated in Figure 1, by the numeral 19, are guided between a pair of leads 20 and 21. These leads are suspended from a connection which is attached to the extreme upper end of the angular boom and serves a double purpose of guiding a steam hammer 22 and the pile 19 which is to be embedded in the soil. Near the lower ends of the leads, the latter may be joined by a detachable connecting beam 23, and the steam hammer guided between these leads is supplied by a hose line 24 with actuating steam generated in the house structure.

The connection which suspends the upper end of the leads from the boom comprises an inverted U-shaped element consisting of downwardly extending arms 25 and 26 which are joined by a cross brace 27, the latter being integral with the arms. A relatively large opening is formed in the cross brace 27 and is adapted to loosely receive a bolt 29 having a head 30 at its lower end. The head 30 of the bolt supports a block 31 having a hemi-spherical surface on its upper side, the hemi-spherical surface being adapted to have the cross brace 27 rest thereon, as illustrated in Figure 2. The opposite end of the bolt 29 is threaded and receives a nut 32 secured against rotation by a cotter pin 33, the latter passing thru the bolt 29. The nut 32 is mounted on the bight 34 of a U-shaped cradle 35. Said cradle has a pair of parallel arms extending upwardly from the bight 34 and thru these arms a bolt 36 passes. This bolt passes thru one arm, then thru openings provided near the upper ends of the beams 15 and 16, forming the boom of the crane and then passes thru the remaining arm of the cradle when fixing the lead connection to the boom of the crane.

Below the position where the U-shaped cradle is attached to the boom, a sheave wheel 37 is rotatably mounted between the beams 15 and 16 of the boom. This sheave wheel has a cable 38 passing around it, one end of which is detachably secured to the steam hammer 32 while the other end is attached to the crane operating mechanism and is used for purposes of lifting and lowering articles from the boom or lifting and lowering the steam hammer or the piles 19, any one of which must be done at different times with this arrangement.

This invention aims to produce an improvement which increases the utility of the crane and permits its adaptability to varying conditions of engineering. In sinking foundations, the prevailing method is to sink piles into the subsoil for forty feet or more. The most desirable position of these piles 19 is a true vertical one, and in order to sink the piles in true vertical position, guides are necessary. This is accomplished by providing leads such as 20 or 21 which are suspended from the end of the boom, and as before noted, hang in vertical position and rest on the ground. Heretofore, these leads have been suspended from the rigid connection which would not permit the leads to be swung in azimuth nor to permit the leads to be swung out of the way when they are not required. Instead, it had been necessary to lower the boom, detach the leads from the rigid connection which suspended the leads from the boom, lay the leads aside and then use the crane for lifting purposes. This mode of operation is now eliminated as the leads may remain permanently suspended from the crane boom and at the same time be swung to a position parallel to the boom where they will not interfere with the movement of the lifting cable 38 which can perform its full duty without any interference or obstruction from the leads. By providing the swivel joint between the rigid cradle 35 and the U-shaped frame suspended from the cradle, a connection is had which permits the frame to be rotated about the bolt 29 as an axis, and as the frame, consisting of members 25, 26 and 27, is supported upon the hemi-spherical surface of the block 31, the leads may be tilted from the suspended position to a position in which they extend parallel to the beams 15 and 16 and anchored in such position without said leads becoming an obstruction to the use of the lifting cable 38, which passes around the sheave wheel 37. The boom, as heretofore described, is rigidly supported by the leads when they rest solidly upon the ground and prevent tilting of the entire crane by such bracing, as the latter forms a secure support upon which the projecting end of the crane rests when said boom is used as a hoisting apparatus.

Furthermore, it is frequently necessary to drive a pile in a ditch or in ground which is below the level of that on which the crane stands. Under such conditions the boom may be lowered until the lower ends of the leads rest on the low ground and stand vertically, in which position they will hold the pile and at the same time support the outer end of the boom, preventing tilting of the crane. Conditions of this kind are frequently met with where the boom has to be lowered to an angle of 30° with the horizontal in order that the leads may rest on the ground in vertical position.

Having thus described the invention, what is claimed as new and desired to be secured by Letters Patent is:

1. In a crane, a boom, leads suspended from said boom, connecting means between said boom and leads permitting rotation of said leads and swinging of the same into a position parallel with the boom, said connecting means comprising a cradle pivoted to and suspended beneath said boom and an inverted U-shaped frame suspended beneath and rotatable relative to said cradle, a bolt connecting said frame and cradle, said frame having an opening permitting passage of said bolt, said opening being larger than said bolt, a block having a hemispherical upper surface mounted on said bolt and upon which said frame is adapted to rest to permit movement of the frame in all directions and leads rigidly connected to the downwardly projecting arms of said frame, said leads being adapted to rest on the ground and to have their free ends located at various positions within the radius of the swing of said boom, substantially described.

2. In a crane, a boom pivotally supported at its inner end, leads suspended from the outer end of said boom, a sheave wheel rotatably mounted in said boom adjacent the point of suspension of said leads, a connection between said leads and boom permitting swinging of said leads from a vertical position to a position parallel with said boom, said connection comprising a cradle pivotally suspended beneath said boom, said leads being suspended from said cradle and free to swing into a vertical position regardless of the position of the boom, said leads being fixed against longitudinal movement thereof relative to the cradle, means for raising and lowering the outer end of said boom, whereby the leads may be let down in vertical position in contact with the ground and serve as a support for the outer end of said boom, means carried by said leads for driving a pile and a cable passing over said sheave and connected to said driving means.

In testimony whereof, I hereunto affix my signature.

LEON PIERCE.